United States Patent
Horvath

[15] 3,659,906
[45] May 2, 1972

[54] WHEEL LOCK CONTROL SYSTEM AND METHOD HAVING HIGH AND LOW MODE SELECTION

[72] Inventor: Robert A. Horvath, Dayton, Ohio
[73] Assignee: General Motors Corporation, Detroit, Mich.
[22] Filed: Feb. 18, 1970
[21] Appl. No.: 12,199

[52] U.S. Cl. ..................303/21 A, 180/79.1, 180/82, 188/181 A, 303/21 EB
[51] Int. Cl. ..................................................B60t 8/04
[58] Field of Search ..................180/6.2, 79.1 X, 79.2, 82 X; 188/181; 303/21, 6

[56] References Cited

UNITED STATES PATENTS

| | | | |
|---|---|---|---|
| 3,288,232 | 11/1966 | Shepherd | 180/6.2 X |
| 3,455,609 | 7/1969 | Bratten | 303/21 CG X |
| 3,482,887 | 12/1969 | Sheppard | 303/21 EB |
| 3,260,555 | 7/1966 | Packer | 303/21 EB |
| 3,528,708 | 9/1970 | Ballard | 303/21 EB |
| 3,494,671 | 2/1970 | Slavin et al. | 303/21 P |
| 3,525,553 | 8/1970 | Carp et al. | 303/21 P |
| 3,583,773 | 6/1971 | Steinbrenner | 303/21 EB |

Primary Examiner—Milton Buchler
Assistant Examiner—John J. McLaughlin
Attorney—W. E. Finken and D. D. McGraw

[57] ABSTRACT

A vehicle wheel lock control system in which the front left and right wheels are provided with separate sensors. The sensors generate signals indicating the changes in wheel velocity during braking and the signals are transmitted to a controller, which, in turn, controls a modulator for the brakes of both front wheels. Due to slight differences in friction coefficient, brake operation, tire and road surfaces, one front wheel will usually have a larger instantaneous wheel slip than the other front wheel and will tend to lock more quickly than the other. Thus, one wheel will have signals generated indicating an incipient wheel lock condition earlier than the other wheel. In normal operation, the front wheel control system will actuate the modulator when both sensors have generated signals indicating the existence of a greater wheel slip than desired for optimum braking, but will not operate when only one wheel causes such a signal to be generated. Under some conditions of vehicle operation, and particularly when leftward or rightward steering is being attempted, the system is modified to cause the modulator to be operated when either of the front wheels causes such a signal to be generated, without also requiring a similar signal from the other wheel. The brake control system for the entire vehicle is also disclosed as including a rear wheel lock control system.

6 Claims, 3 Drawing Figures

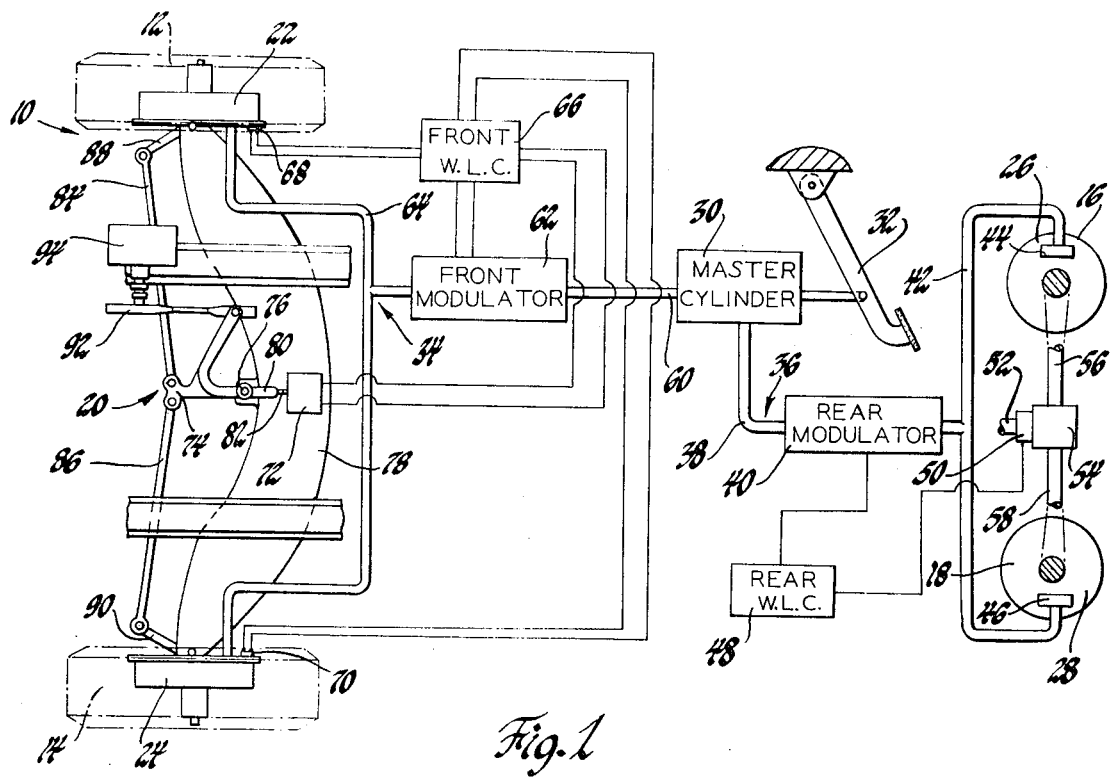
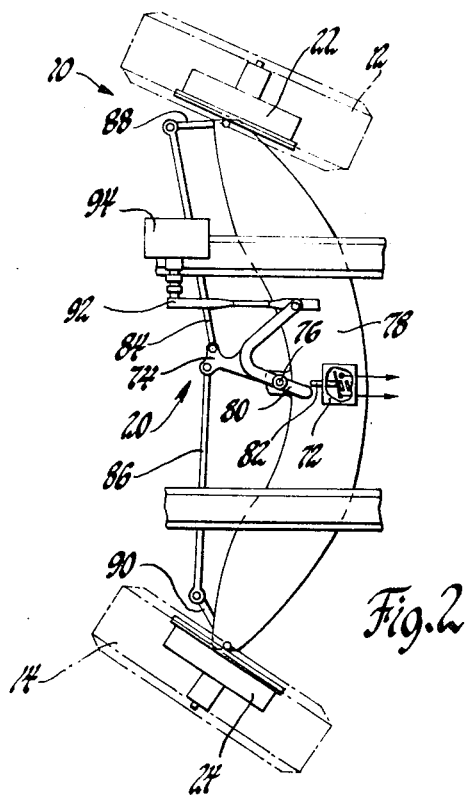
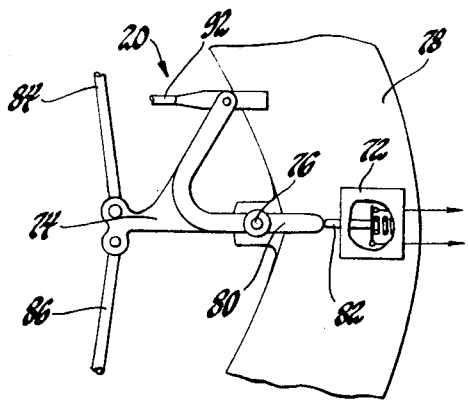
Fig.1
Fig.2
Fig.3
INVENTOR.
Robert A. Horvath
BY
D.D. McGraw
ATTORNEY

WHEEL LOCK CONTROL SYSTEM AND METHOD HAVING HIGH AND LOW MODE SELECTION

The invention relates to a wheel lock control system generally referred to as an anti-lock system, and more particularly to one which normally operates on a high mode selection in which the two vehicle steering wheels must both generate excessive wheel slip signals in order to operate the brake pressure modulator. When a condition requiring earlier modulating control occurs, the system operates the brake pressure modulator when an excessive wheel slip signal is generated from either one of the wheels. This is referred to as a low mode selection. The vehicle operating condition usually existing in which a low mode selection is desirable is that of steering the vehicle either leftwardly or rightwardly instead of straight ahead. The invention is, therefore, particularly concerned with a system which senses the steering position of the wheels or the wheel steering control mechanism and utilizes the signal of the sensed condition to change the mode selection. In the embodiment shown, the controlling portion of the system is electrical in nature and the high-low mode selector is a switch activated from one switch condition to another when the steering mechanism is moved off center leftwardly or rightwardly beyond a predetermined amount. The switch may be arranged so that it is in the closed position when the front wheels are straight, thus signaling the controller to select the high mode of operation. When the steering mechanism is moved to turn the front wheels, the switch is opened, signaling the controller to select the low mode of operation. This mode insures rotation of both of the front wheels during braking and gives better steerability.

In the drawing:

FIG. 1 is a schematic illustration of a vehicle having a wheel lock control system embodying the invention, with parts broken away and in section.

FIG. 2 illustrates a portion of the vehicle of FIG. 1, showing the steering mechanism in a right turn condition.

FIG. 3 is a fragmentary view of a portion of FIG. 1 providing an enlarged illustration of the mechanism activating the high-low mode selector.

The vehicle 10 is schematically illustrated as having front wheels 12 and 14 and rear wheels 16 and 18, with a suitable front wheel steering mechanism 20. The front wheels are provided with brakes 22 and 24, and the rear wheels are provided with brakes 26 and 28. The brake system includes a master cylinder 30 activated by brake pedal 32, a front brake hydraulic circuit 34 connected to the front brakes 22 and 24, and a rear brake hydraulic circuit 36 connected to the rear brakes 26 and 28. Both hydraulic circuits are activated by the master cylinder 30, which may also include a power brake booster of a suitable type. In the vehicle illustrated, the entire brake system also includes a front wheel lock control and a rear wheel lock control, thus providing a 4-wheel lock control arrangement.

Since the invention as embodied in vehicle 10 is not directly related to the rear wheel lock control system, that system will be only generally described. The system may be any of several types, such as that disclosed in U.S. Pat. application, Ser. No. 806,807, entitled "Adaptive Control Anti-Lock Brake System" and filed in the names of David L. Van Ostrom, Douglas W. Sweet and David G. Beyerlein on Mar. 13, 1969, by way of example. The rear brake hydraulic circuit includes a brake line 38 connecting the master cylinder 30 with the rear brake modulator 40. The rear brake apply line 42 is connected to the rear brake wheel cylinders 44 and 46 of rear brakes 26 and 28, respectively. The modulator 40 is controlled by the rear wheel lock controller 48, which receives appropriate signals from sensor 50. The sensor is illustrated as being driven by the drive shaft 52, which drives both rear wheels 16 and 18 through differential 54 and the rear axles 56 and 58. The sensor 50 generates appropriate wheel condition signals which are utilized by the controller 48 to cause the modulator 40 to control the brake apply pressure in brake apply line 42 when conditions make it desirable.

The front brake hydraulic circuit includes the front brake line 60 which connects the master cylinder 30 to the front brake modulator 62. The front brake apply line 64 connects the output of modulator 62 with the wheel cylinder of the front brakes 22 and 24. It should be noted that the brakes are described as having wheel cylinders, but this in no way limits the type of brake construction utilized. For example, the brakes may be disc brakes as well as drum brakes. The particular type of brake bears no relation to the invention, and any suitable brake type may be utilized.

The modulator 62 is controlled by the front wheel lock controller 66. The wheel brakes 22 and 24 are respectively provided with wheel signal condition generators 68 and 70. These generators sense the rotational conditions of the wheels with which they are connected. They may sense wheel velocity or wheel acceleration and deceleration in any suitable manner to generate signals indicating the rotational condition of the wheels. These signals are delivered from each signal generator to the controller 66, which, in turn, generates signals delivered to the modulator 62. A high-low mode selector 72 is provided and is connected with the controller 66 so as to select the mode of controller operation.

The steering mechanism 20 is illustrated as being of the center arm type, although any other suitable steering linkage arrangement may be utilized. The mechanism includes a center arm 74 pivoted at 76 on the vehicle frame cross member 78. The rear end 80 of arm 74 is schematically illustrated as engaging the selector button 82 of mode selector 72 when the steering mechanism is positioned for straight-ahead driving. The other end of center arm 74 is connected to tie rods 84 and 86, which are respectively connected to steering arms 89 and 90 provided as a part of the steering knuckles for the respective front wheels 12 and 14. The center arm 74 is also connected to the drag link 92 which is moved by a steering gear mechanism 94. This mechanism is operatively controlled by the vehicle operator through a steering wheel and steering shaft arrangement. It may be of the power assisted or manual type.

The mode selector 72 is illustrated as being a switch with the button 82 holding the switch closed when the rear end 80 of center arm 74 engages the button, as shown in FIGS. 1 and 3. This occurs when the steering mechanism is in the front wheels are straight ahead. When the steering mechanism is moved either leftwardly or rightwardly, center arm 74 has its rear end 80 moved out of engagement with button 82, and the switch opens. FIG. 2 shows the mechanism with the front wheels being turned rightwardly. The release of selector button 82 may occur upon any desired predetermined steering angle by appropriately shaping the rear end 80 of the center arm 74 so that it engages and disengages the button 82 accordingly.

The system and method embodying the invention is so arranged that during stops with straight-ahead steering the high mode of operation is selected. Thus, one steering wheel may be braked to an excessive wheel slip degree before the other wheel reaches that degree and braking will continue without modification. Modification occurs only when both steering wheels are braked to a point at which excessive wheel slip occurs. This will give an excellent stopping distance on a split coefficient road surface or if some brake imbalance is present. The system shifts to the low mode of operation when a steering force is present and the steering wheels are turned in an effort to steer while braking is occurring. The low mode permits the controller and modulator to release or reduce the brake pressure to the steering wheels as soon as the first one of the steering wheels has excessive wheel slip. As long as the steering situation is present, the steering wheel anti-lock braking system selects this low mode of operation.

The mode selector 72 is illustrated and described as a switch which is closed when the steering mechanism and steering wheels are straight ahead, and is open when a steering angle is present. The reverse arrangement may also be utilized, or the selector may be arranged to provide one signal during straightahead steering by the closure of one group of contacts and a different signal when steering angle is present by closing a different group of contacts. The mode selector may be built into any portion of the steering gear mechanism so long as it can sense the steering angle established by the vehicle operator. The system may be utilized on vehicles having other vehicle conditions of operation making it desirable to select between the high and low modes of operation. Such conditions may include vehicle loading, road grades on which the vehicle is driving, or the action of a locking differential, by way of example. It is only in the preferred embodiment illustrated that the steering angle condition is utilized. This is one of the most important vehicle conditions affected by brake anti-lock mode operation.

What is claimed is:

1. In a vehicle wheel lock control system having first and second wheel condition signal generating means respectively associated with different wheels to be braked, brake line pressure generating means, brake line pressure modulating means controlling wheel brake pressure delivered to said wheels to be braked, and logic control means controlling said modulating means in accordance with signals from said wheel condition signal generating means, the improvement comprising:

third signal generating means responsive to a vehicle condition of operation having at least two condition modes, said third signal generating means delivering a first signal to said logic control means in response to one vehicle condition mode and a second signal in response to another vehicle condition mode, said logic control means controlling said modulating means in response to said first signal and limiting modulating action of said modulating means to response to wheel condition signals from both of said first and second wheel condition signal generating means indicating incipient wheel lock, said logic control means controlling said modulating means in response to said second signal and permitting modulating action of said modulating means in response to a wheel condition signal from either of said first and second wheel condition signal generating means indicating incipient wheel lock of one of the wheels.

2. The mechanism of claim 1, said vehicle condition of operation being steering of said wheels to be braked, said first signal reflecting a vehicle condition mode of straightahead steering and said second signal reflecting a vehicle condition mode of turning said wheels to change the direction of vehicle travel.

3. A vehicle wheel brake wheel slip control system comprising:

first and second vehicle steerable wheels, steering mechanism therefor, wheel brakes for said wheels, means for controlling the application of brake force to said wheel brakes, signal generating means for each of said steerable wheels each generating an excessive wheel slip signal independently of other vehicle wheels when the wheel associated therewith slips excessively during braking, means sensing the operation of said steering mechanism to steer said wheels in either direction relative to a straight line and generating a turning signal, and logic control means receiving said signals and acting to cause said controlling means to decrease brake force applied to said wheel brakes to decrease wheel slip of said wheels below excessive wheel slip and to permit reapplication of brake force to said wheel brakes thereafter, said logic control means so acting only upon receipt of both of said excessive wheel slip signals when said turning signal is not being generated, and so acting upon receipt of the first generated of said excessive wheel slip signals when said turning signal is being generated.

4. The control system of claim 3, further comprising:

other vehicle wheels which are non-steerable, wheel brakes for said other wheels, and other wheel brake wheel slip control means for said other vehicle wheels, said other control means acting to prevent excessive wheel slip of said other vehicle wheels during wheel braking independently of said signals from said steerable wheels signal generating means.

5. The method of controlling vehicle wheel slip of vehicle wheels capable of exhibiting different concurrent wheel slip characteristics during braking, said method comprising:

sensing excessive wheel slip of a first wheel to be controlled by wheel slip control means and generating a first excessive wheel slip signal, sensing excessive wheel slip of a second wheel to be controlled by said wheel slip control means and generating a second excessive wheel slip signal, normally actuating the wheel slip control means only upon the generation of both of the first and second signals, sensing a vehicle condition affected adversely by excessive wheel slip during braking and generating a third signal when the condition occurs, and actuating the wheel slip control means upon the generation of the third signal and either one of the first and second signals to control the wheel slip of the first and second wheels and prevent excessive wheel slip during braking to the extent that the sensed vehicle condition is not adversely affected.

6. The method of claim 5, wherein the sensed vehicle condition is steering of the first and second wheels to turn the vehicle, and the third signal signifies movement of vehicle steering mechanism either leftward or rightward from a straight-ahead position.

* * * * *